United States Patent [19]
Gelfman

[11] 3,744,359
[45] July 10, 1973

[54] APPARATUS FOR CUTTING GLASS BOTTLES AND THE LIKE

[76] Inventor: Ephrem J. Gelfman, P. O. Box 3443, Boulder, Colo. 80302

[22] Filed: May 4, 1972

[21] Appl. No.: 250,288

[52] U.S. Cl.................. 82/92, 30/164.95, 225/93.5, 225/96
[51] Int. Cl............................. B26d 3/08, B26f 3/06
[58] Field of Search........................ 225/2, 93.5, 96, 225/103; 30/164.95, 164.9; 82/92, 84

[56] References Cited
UNITED STATES PATENTS

| 3,572,564 | 3/1971 | Fleming | 225/96 X |
| 3,699,829 | 10/1972 | Gelfman | 225/96 X |

*Primary Examiner*—Frank T. Yost
*Attorney*—Reilly and Lewis

[57] ABSTRACT

An apparatus for cutting hollow objects of substantially circular cross-section, such as glass bottles, includes a base structure having a first set of laterally spaced support members at one end with one of the support members defining a cutting edge for forming a score line in an object rotated on the base structure. Spaced longitudinally from the one end of the base structure is a second set of laterally spaced support members which are mounted on a support plate that is disposed for longitudinal sliding movement along the base structure between fixed positions whereby the spacing between the first and second set of support members can be adjusted. A stop plate is mounted adjacent the second set of support members for longitudinal movement relative thereto and relative to the first set of support members.

11 Claims, 6 Drawing Figures

Patented July 10, 1973 3,744,359
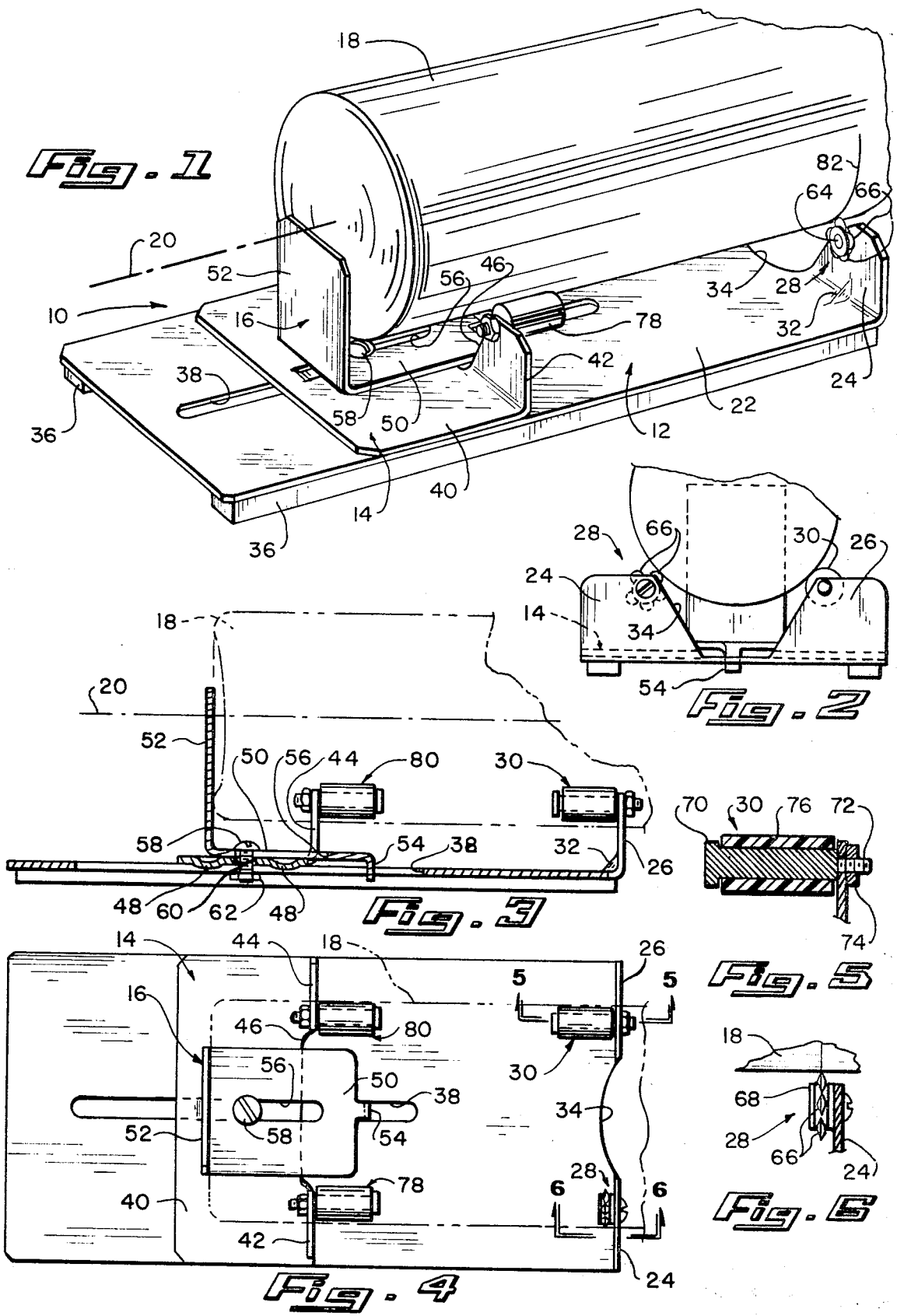

APPARATUS FOR CUTTING GLASS BOTTLES AND THE LIKE

This invention relates generally to apparatus for cutting hollow objects of substantially circular transverse cross-section and more particularly to portable apparatus for cutting hollow objects of substantially circular cross-section wherein a stop plate is longitudinally movable with respect to laterally spaced support members whereby various sized and shaped objects can be cut.

The art of cutting glass bottles dates back many centuries and is still in widespread industrial use. More recently, however, the art of cutting glass, especially that of cutting glass bottles to make various types of containers, has become a craft or favorite past-time of many amateur glass cutters. Consequently, numerous types of devices for cutting bottles or the like have been contrived to satisfy the growing demand for these devices. An example of such a device is disclosed in my copending United States patent application Ser. No. 53,741 filed July 10, 1970, now U.S. Pat. No. 3,699,829. Since the aforementioned devices, in large part, are being used by amateur glass or bottle cutters, it is important to their commercial acceptance that they be relatively simple to operate yet functionally dependable to place a uniform circular score line around the hollow object or bottle so that a clean separation along the score line can be made.

The apparatus of the present invention is portable, very simple and is broadly defined by laterally spaced guides to support a bottle for rolling movement thereon, an adjustable end stop to set the length of cut and a cutter at one end opposite to the end stop. More specifically, the present invention is characterized in that the end stop is adjustable independently of the guides. It is also desirable that the guides be made up of spaced sets of guides which are longitudinally movable relative to each other in order to vary the support locations for an object to be cut so that objects of various shapes and sizes can be desirably stabilized while being scored by the cutter.

Accordingly, it is an object of the present invention to provide an apparatus for cutting hollow objects of substantially circular cross-section that is simple to operate, is effective to place a uniform score line around the hollow object for clean separation of adjacent segments of the object, and is characterized by affording a wider latitude of adjustability in cutting different length bottles.

It is another object of the present invention to provide an apparatus for cutting hollow objects of substantially circular cross-sectional which has a longitudinally movable stop plate whereby various lengths and shapes of hollow objects can be desirably scored.

It is still another object of the present invention to provide an apparatus for cutting hollow objects of substantially circular cross-section which has first and second sets of laterally spaced support members, the first set of support members being longitudinally movable relative to the second set of support members with one of said second set of support members defining a glass cutting edge, and a stop plate which is longitudinally movable relative to the first and second sets of support members for more versatility in the cutting of hollow objects.

Other objects, advantages and features of the present invention will become more apparent as the description proceeds taken in conjunction with the accompanying drawings, in which:

FIG. 1 is a perspective view of the glass cutting apparatus of the present invention having a glass bottle disposed thereon in a position to be scored by the cutting edge of the apparatus.

FIG. 2 is a front elevational view of the apparatus shown in FIG. 1.

FIG. 3 is a central longitudinal vertical section of the apparatus shown in FIG. 1.

FIG. 4 is a top plan view of the apparatus shown in FIG. 1.

FIG. 5 is an enlarged fragmentary vertical section taken through one of the support members in the apparatus of the invention shown in FIG. 1; and FIG. 6 is an enlarged fragmentary vertical section showing the cutting edge of the apparatus shown in FIG. 1 in operable contact with a fragmentary portion of a bottle.

A preferred form of portable cutting apparatus 10 according to the present invention is shown by way of illustrative example in FIG. 1 to include an elongated base structure 12 having a longitudinally movable support plate 14 and stop plate or end stop 16 mounted thereon in a manner such that a bottle 18 or other hollow object of substantially circular cross-section can be retained and supported on the apparatus 10 for rotational movement about its longitudinal axis 20.

The base structure 12 of the cutting apparatus can be seen to have a flat planar bottom surface 22 and intregal upturned laterally spaced support arms 24 and 26 at one end mounting guide or support members 28 and 30, respectively, as will be described hereinafter. Each support arm 24 and 26 is preferably crimped at 32 to lend added strength to the arm. A substantially semicircular, upwardly directed opening 34 is defined between the support arms 24 and 26 to afford clearance for the bottle 18 or other hollow object of substantially circular cross-section which is resting on the apparatus for cutting operations. Resilient cushion strips 36 are attached under the base structure 12 along each side thereof to cushion the apparatus and give it limited adhesion when positioned on a work surface.

In order to guide the longitudinal movement of the sliding support plate 14 and the stop plate 16 along the base structure, an elongated longitudinally extending centrally located guide slot 38 is provided in the flat planar portion 22 of the base structure along a major portion of the length of the apparatus. The slidable support plate 14 is seen to resemble the base structure 12 in that it has a substantially flat planar portion 40 with two upturned integral support arms 42 and 44 near its forward end. A passage or opening 46 is defined between the support arms 42 and 44 giving clearance for the bottle 18 and also for the stop plate 16. Longitudinally aligned, downwardly protruding dimples 48, as shown in FIG. 3, are provided in the flat planar portion 40 of the support plate to extend down into the guide slot 38 to guide the sliding movement of the support plate whereby it can only be moved longitudinally of the base structure.

For both simplicity and utilitarian purposes, the stop plate 16 can be seen to be of generally L-shaped longitudinal cross-section having a flat lower horizontal segment 50 and a rear upturned flat vertical segment 52 against which one end of the bottle 18 can be abutted. The lower horizontal segment 50 of the stop plate 16 is provided with a downwardly turned, centrally located guide finger 54 at its forward edge which is adapted to protrude downwardly into the guide slot 38 in the base structure 12 and a relatively short longitudinally extending guide slot 56 in the segment 50 is longitudinally aligned with the guide finger 54. A threaded bolt 58 is passed downwardly through the slot 56 in the stop plate through an opening 60 in the support plate, and through the slot 38 in the base structure to adjustably retain the support plate and the stop plate in desired alignment with respect to one another and to the base structure. A removable nut 62 is threaded onto the lower end of the screw bolt 58 to press the three stacked members together when tightened so as to releasably lock, or clamp the members together. It can, therefore, be seen that loosening of the nut 62 on the screw bolt enables the support plate 14 and the stop plate 16 to be moved longitudinally of the base structure 12 and enables the stop plate to be moved longitudinally relative to the support plate and guides thereon to lend the desired versatility and stability in handling and supporting bottles or other similar objects of various sizes and shapes to the apparatus.

The support or guide members 28 and 30 at the forward end of the base structure are spaced laterally a distance which is less than the diameter of the bottle 18 or other object of be cut and extend rearwardly toward the support plate 14. The support member 28 is a conventional glass cutter which has a center axis defined by a support shaft 64 passing through the support arm 24 and comprises a plurality of cutter wheels 66, FIG. 6, mounted for free rotation on individual shafts on a rotatable hub 68. These cutter wheels have rotational axes arranged on a common circle concentric with the support shaft 64 at equal circumferentially spaced intervals and the periphery of each wheel 66 extends beyond the top and side edges of the support arm 24. The support member 30 could take one of many various forms as long as it is adapted to retain the bottle 18 in the desired position during rotational or rolling movement of the bottle about its central longitudinal axis 20. In the preferred form, however, the support member 30 is a journaled roller comprised of a flat-headed bolt 70, FIG. 5, with a threaded end portion 72 which extends through an opening in the associated support arm 26. A nut 74 threaded on the threaded end portion of the bolt secures the support member 30 to the support arm 26. A central shank portion of the bolt 70 carries for free rotation threrabout a sleeve 76 of rubber, nylon or the like which is adapted to contact the peripheral surface of the bottle 18 to afford a relatively long line of engagement with the bottle.

Other support members or guides 78 and 80, identical to support member 30, are mounted on the upstanding support arms 42 and 44 of the support plate 14 in axial alignment with the support members 28 and 30, respectively and extend forwardly toward the support members 28 and 30. Again, however the support members 78 and 80 on the support plate could take most any form which is suitable for supporting a bottle or the like for rotational movement about its longitudinal axis. It can be seen that the support members 78 and 80 on the support plate extend outwardly from the top and side edges of the support arms 42 and 44, respectively, so as to retain the bottle in a manner such that the bottle does not come into contact with either of the support arms.

It will be appreciated from the foregoing description that due to the relative mobility between the base structure, the support plate and the stop plate, various shapes and sizes of objects having substantially circular transverse cross-sections can be stabilized on the apparatus for rotative movement so that a uniform score line can be quickly and easily formed in the peripheral surface of the object. It will also be appreciated that objects which are relatively long in comparison to the length of the base structure, can be accommodated with the apparatus since the vertical segment 52 of the stop plate can actually be extended beyond the rear edges of the base when the support plate is positioned near the rear end of the guide slot 38. Moreover, relatively short objects can be readily accommodated by reversing the mounting of the stop plate 16 so that the vertical segment 52 can be extended forwardly toward the arms 24 and 26 and beyond the guide slot 38. Similarly, the support plate 14 can be reversed, or the support members 78 and 80 can be reversed on the support arms 42 and 44, so that the guide members 78 and 80 are extended in a direction away from the support arms 24 and 26. The latter is desirable for cutting glass bottles of uneven diameter in order to enable positioning of the guides 78 and 80 at the desired point on the bottle.

When using the cutting apparatus 10, the bottle or other object of substantially circular transverse cross-section is placed on the apparatus so as to be supported by the four support members 28, 30, 78 and 80 with its closed end resting against the vertical segment 52 of the stop plate 16. The stop plate is moved longitudinally of the apparatus by loosening the nut 62 on the screw bolt 58 until the cutting edge of the support member 28 is aligned with the bottle at the proper location for the desired length of cut. Depending on the size and length of the bottle being cut, the support plate 14 and guides 78 and 80 can be moved relative to the stop plate 16 while the nut 62 is loosened so as to provide intermediate support for the bottle at a location between the forward end of the base structure and the vertical segment 52 of the stop plate. For relatively long cuts, it has been found desirable to provide a relatively large spacing between the support members 78 and 80 on the support plate and the vertical segments 52 of the stop plate so that the bottle will be adequately supported at some intermediate location along the length of cut. For shorter cuts, the spacing between the support members 78 and 80 on the support plate and the vertical segment 52 of the stop plate is not as critical. With the stop plate 16 and support plate 14 desirably positioned relative to the cutting edge, the nut 62 on the screw bolt can be tightened to fix the stop plate and support plate in the desired positions. When the bottle is positioned as shown in FIG. 1, with the bottom of the bottle against the stop plate, the bottle is rotated one complete revolution about its longitudinal axis 20 so that the cutting edge forms a circular groove or score line 82 in the peripheral surface of the bottle. After the circular score line is formed, heat is applied to the bottle along the score line. The heat may be applied with an open flame, such as, for example, with a candle or this may be accomplished with hot water near boiling temperature, such as, by running it under a tap while rotating the bottle. The heated bottle is then rapidly cooled or quenched as with cold water or ice so that the rapid contraction of the glass effects a clean break or fracture in the bottle along the score line to separate the adjacent segments of the bottle. The edges of the bottle along the score line are then smoothed to remove any sharp edges by sanding or grinding. This may be accomplished, for example, by applying wet or dry emery cloth, followed by using a suitable glass grinding powder with water for wetting to provide a smooth rounded upper edge.

It will be evident that the lateral guides or suuport members 78, 80 and 30 may be in the form of one continuous guide member along each longitudinal side of the base with the cutter 28 disposed at one end of a guide and the end stop 16 longitudinally movable between the guides to allow for various length cuts. This arrangement would also give the desired intermediate support afforded by the preferred embodiment described in detail herein.

Although the present invention has been described with a certain degree of particularlity, it is understood that the present disclosure has been made by way of example and that changes in details of structure may be made without departing from the spirit thereof.

What is claimed is:

1. Portable glass cutter apparatus for cutting hollow objects of substantially circular cross-section comprising a base, an end stop member disposed on said base to define means for positioning the end of the hollow object, laterally spaced guide means extending upwardly from and along opposite sides of said base and straddling said end stop whereby to guide and support an object to be cut for rotational movement about its longitudinal axis, and a cutting edge aligned with one end of one of the laterally spaced guide means and engageable with the peripheral surface of the object to be cut whereby a score line can be formed in the peripheral surface by rotating the hollow object about its longitudinal axis.

2. Apparatus for cutting hollow objects of substantially circular cross-section comprising a base, spaced upstanding portions disposed on said base for movement relative to each other, lock means to fix the upstanding portions at a selected spacing relative to each other, a stop member disposed on said base for movement relative to both upstanding portions to defined means for positioning the end of the hollow object, a first set of laterally spaced support members associated with one of said upstanding portions, a second set of laterally spaced support members associated with the other of said upstanding portions, said first and second set of support members adapted to support the hollow object for rotational movement about its longitudinal axis, one of said second set of support members having a cutting edge for engagement with the peripheral surface of the hollow object whereby a score line can be formed in the peripheral surface by rotating the hollow object about its longitudinal axis.

3. The apparatus of claim 2 wherein said other upstanding portion is fixed relative to the base and said one upstanding portion is movable relative to the base.

4. The apparatus of claim 3 wherein said first set of support members extends away from said one upstanding portion toward said other upstanding portion and said second set of support members extends away from said other upstanding portion toward said one upstanding portion.

5. The apparaus of claim 4 wherein the support members of the first set have axes which are coaxial with axes of the support members of the second set.

6. The apparatus of claim 5 wherein said support members of the first set are rollers and the other support member of the second set is a roller.

7. The apparatus of claim 3 wherein said base includes guide means adapted to cooperate with said one upstanding portion to guide the movement thereof.

8. The apparatus of claim 7 wherein said stop member includes a guide portion adapted to cooperate with said guide means so that the movement of the stop member is also guided.

9. The apparatus of claim 3 wherein said base has an elongated slot therein, said one upstanding portion includes means extending into said slot to guide the movement of said one upstanding portion, and said stop member has a guide portion adapted to extend into said slot to guide the movement of said stop member.

10. The apparatus of claim 9 wherein said one upstanding portion and said stop member are operably connected together for limited relative movement between fixed positions.

11. Apparatus for cutting hollow objects, of substantially circular cross-section, comprising a base structure having a substantially flat lower surface and a pair of laterally spaced upstanding support arms at one end, an elongated slot in the lower surface of the base, a support plate slidably mounted on the base having a guide member extending into the elongated slot to guide its movement along the lower surface of the base, a pair of laterally spaced support arms on the support plate, a stop member having a substantially flat lower portion adapted to slidably rest on the support plate and an upturned portion defining an abutment against which the end of a hollow object can be placed, a guide member on said stop member extending into the slot in the base structure to guide movement of the stop member relative to the base structure, an elongated slot in the lower portion of the stop member extending parallel to the elongated slot in the base structure, a fastener extending through the slot in the stop member as well as an aperture in the support plate and the slot in the base structure whereby the three components can be selectively moved and reversibly positioned relative to each other and fixed at desired positions relative to each other, a pair of support rollers on the support arms of said support plate, a support roller on one of the support arms of the base structure in axial alignment with one of the support rollers on the support plate, and a rotatable cutting edge on the other support arms of the base structure in axial alignment with the other support roller on the support plate whereby a hollow object of substantially circular transverse cross-section can be supported by the support rollers and the cutting edge with one end against the stop member so that rotation of the object about its longitudinal axis will allow the cutting edge to form a score line around the peripheral surface of the object.

* * * * *